US009764392B2

(12) United States Patent
Perlin et al.

(10) Patent No.: US 9,764,392 B2
(45) Date of Patent: Sep. 19, 2017

(54) DEVICE AND METHOD FOR LOCALIZING A POSITION ON A PART

(71) Applicant: SNECMA, Paris (FR)

(72) Inventors: Matthieu Patrick Jean Roger Perlin, Montgeron (FR); Damien Vincent Le Cloarec, Fontenailles (FR); Dominique Michel Serge Magnaudeix, Yerres (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/721,168

(22) Filed: May 26, 2015

(65) Prior Publication Data

US 2015/0336181 A1 Nov. 26, 2015

(30) Foreign Application Priority Data

May 26, 2014 (FR) ..................... 14 54719

(51) Int. Cl.
*B23B 47/28* (2006.01)
*B23B 49/02* (2006.01)
*B23Q 35/02* (2006.01)

(52) U.S. Cl.
CPC ............ *B23B 49/023* (2013.01); *B23Q 35/02* (2013.01); *B23B 2215/76* (2013.01); *Y10T 29/50* (2015.01); *Y10T 408/03* (2015.01); *Y10T 408/553* (2015.01); *Y10T 408/567* (2015.01); *Y10T 408/568* (2015.01); *Y10T 408/569* (2015.01)

(58) Field of Classification Search
CPC ....... B23B 47/28; B23B 47/287; B23B 49/02; B23B 49/023; B23B 2247/18; B23B 2247/00; Y10T 408/553; Y10T 408/567–408/569; Y10T 408/56245
See application file for complete search history.

(56) References Cited

U.S. PATENT DOCUMENTS

| 2,176,608 | A | * | 10/1939 | Marsilius | ................ B25B 1/103 269/146 |
| 2,497,679 | A | | 2/1950 | Maples | |
| 2,619,730 | A | * | 12/1952 | Carter | ...................... B25H 7/00 33/666 |
| 2,810,310 | A | * | 10/1957 | Saunders | .............. B23B 47/288 408/109 |
| 2,857,790 | A | | 10/1958 | Lee | |

(Continued)

FOREIGN PATENT DOCUMENTS

| EP | 37712 A2 * | 10/1981 |
| KR | 1020110025260 A | 3/2011 |

OTHER PUBLICATIONS

Search Report issued Nov. 20, 2015 in United Kingdom Patent Application GB1509053.3.

(Continued)

*Primary Examiner* — Daniel Howell
*Assistant Examiner* — Chwen-Wei Su
(74) *Attorney, Agent, or Firm* — Oblon, McClelland, Maier & Neustadt, L.L.P.

(57) ABSTRACT

A device for localizing a position on a part includes a support to receive the part, a bushing movably mounted with respect to the support, a removable localization member to be inserted into the bushing, and a blocking device to fix the bushing with respect to the support and to maintain it in position.

12 Claims, 4 Drawing Sheets

(56) References Cited

U.S. PATENT DOCUMENTS

| | | | | |
|---|---|---|---|---|
| 5,388,933 A | * | 2/1995 | Dunbar | B23B 47/284 |
| | | | | 408/115 B |
| 6,413,022 B1 | | 7/2002 | Sarh | |
| 6,447,220 B1 | * | 9/2002 | Ricci | B23B 29/02 |
| | | | | 408/102 |
| 7,832,496 B2 | * | 11/2010 | Nakayabu | B23B 41/02 |
| | | | | 173/184 |
| 9,108,250 B1 | * | 8/2015 | Bui | B23B 47/28 |
| 9,370,828 B2 | * | 6/2016 | Adkins | B23B 47/288 |
| 2002/0106253 A1 | * | 8/2002 | Coleiro | B23B 47/287 |
| | | | | 408/3 |
| 2005/0147477 A1 | | 7/2005 | Clark | |
| 2007/0102578 A1 | | 5/2007 | Clark | |
| 2009/0010726 A1 | * | 1/2009 | Brugman | B23Q 9/0042 |
| | | | | 408/1 R |
| 2015/0056034 A1 | * | 2/2015 | Anson | B23B 49/026 |
| | | | | 408/115 B |

OTHER PUBLICATIONS

French Preliminary Search Report issued Jan. 12, 2015 in French Application 14 54719, filed on May 26, 2014 ( with English Translation of Categories of cited Documents).

* cited by examiner

DEVICE AND METHOD FOR LOCALIZING A POSITION ON A PART

FIELD OF THE INVENTION

The present discussion relates to the field of the manufacturing of parts and more particularly to a device and to a method for localizing a position on a part.

TECHNOLOGICAL BACKGROUND

Parts formed with several portions are known, for example profiled elements of a turbine engine comprising a main body in a composite material and a metal reinforcement. Upon using the profiled element in operation or during production phases, the reinforcements may be worn or damaged while the main body is protected. Thus, it may be advantageous, in maintenance and in production, to replace the reinforcement while retaining the original main body.

In order not to weaken the main body, it is preferable to reuse the attachment elements (for example a riveting, tapping hole, etc.) already provided on the main body. Such an operation however requires exact localization, on the new reinforcement, of the positions of these attachment elements. Therefore there exists a need for a device or a method for localizing a position on a part.

PRESENTATION OF THE INVENTION

The present discussion relates to a device for localizing a position on a part, comprising a support configured for receiving the part, a bushing movably mounted relatively to the support, a removable localization member configured so as to be inserted into the bushing and blocking means able to fix the bushing relatively to the support and to maintain it in position.

The bushing is configured for receiving the removable localization member. The localization member, when it is inserted into the bushing movably mounted relatively to the support, is able to travel over a portion of the surface of the part in order to detect the position to be localized on the part. During its travel, the localization member drives the bushing. The bushing therefore follows the movements of the localization member when the localization member is inserted into the bushing. The blocking means are used for fixing the bushing relatively to at least one portion of the support and maintaining the bushing in position when the localization member has localized the position to be localized. Thus, the bushing is intended to surround the position to be localized. Subsequently, it is possible to remove the removable localization member from the bushing, for example with the purpose of introducing into the bushing a machining tool.

The bushing operates like a mark of the localized position. The device therefore gives the possibility of exactly localizing a position on the part and of retaining this marked position even if the part is removed subsequently. In particular, the device gives the possibility of localizing a position on an old part and of transferring this position on a new part which is placed in the support. The maintenance and repair operations are therefore facilitated and their accuracy is increased by means of such a device.

Further, the variability of the position of the bushing allows the device to easily adapt to different part geometries.

In certain embodiments, the support comprises at least one housing and the bushing is movably mounted in said housing. As the housing is provided on the support, the position of the housing is fixed with respect to the part as soon as the part is in the support. Thus, when the bushing is fixed (blocked) by blocking means, the position of the bushing is fixed with respect to the part.

In certain embodiments, alternatively or additionally, the bushing is connected to the support through an arm including at least one adjustable link (joint). The link may be a slider link (translation), a pivot, a ball joint (rotation) or any type of link. In such embodiments, at least one portion of the blocking means may be provided for blocking the link in position.

In certain embodiments, the housing is made in a retractable portion of the support. By retractable portion, is meant a detachable portion of the support or a movable portion relatively to the remainder of the support while remaining bound thereto. Thus the retractable portion may be retracted, for example for allowing insertion or withdrawal of a part on the support. The presence of a retractable portion gives the possibility of inserting into the support parts of complex geometry and/or of localizing any position at the surface of the part, independently of constraints for installing the part in the support.

In certain embodiments, the retractable portion may be movable relatively to the remainder of the support and include second blocking means for locking the position of the retractable portion relatively to the remainder of the support.

In certain embodiments, the support comprises several housings. The support thus allows localization of several positions, optionally simultaneously.

In certain of these embodiments, the housings are pre-positioned at the positions to be localized. In certain embodiments, a housing is provided for each position to be localized.

In certain embodiments, the localization member has raised/recessed portions mating raised/recessed portions of the part to be localized. The raised/recessed portions may for example be a protrusion intended to localize a hole on the part. According to another example, the raised/recessed portions may be a recess intended to localize a bump on the part. The expression "mating raised/recessed portions" is to be understood in a broad sense insofar that it is not necessary that the raised/recessed portions of the localization member and of the part exactly match each other (i.e. that one is the exact negative of the other). It is sufficient that the raised/recessed portions of the localization member and those to be localized on the part fit together in a sufficiently discriminating way so that localization is reliable. By such a characteristic, the accuracy and ease in applying the localization are increased.

In certain embodiments, the localization member comprises a probe. This may be a probe with contact or without contact, for example a program with eddy currents, ultrasonic waves, etc., or any probe used in a non-distractive and/or non-invasive method. Such a probe gives the possibility of increasing the accuracy of the detection and of localizing positions not visible from the outside of the part. Further, with a localization member provided with a probe sending back a signal, the localization device may be automated so as to have the localization performed by an autonomous robot.

In certain embodiments, the device further comprises a ball joint allowing rotation of the localization member when the latter is inserted into the bushing, and the blocking means comprise a locking element configured for blocking rotation of the ball joint. Thus, the localization member may be displaced and blocked in rotation in order to be all the better aligned with the position to be localized.

The present discussion also relates to a method for localizing a position on a part, comprising the following steps:
- providing a part and a support;
- installing the part in the support;
- mounting a movable bushing;
- inserting a localization member into the bushing and moving the bushing until the position of the localization member coincides with the position to be localized;
- fixing the bushing with respect to the support by blocking means, in the position determined in the previous step.

Such a method may in particular use a localization device according to any of the embodiments described earlier. The coincidence of the localization member with the position to be localized may be detected in several ways, depending on the type of localization member and on the nature of the position to be localized, optionally in a similar way as to what was explained earlier.

Such a method allows easy, accurate localization and applying simple tools which adapt to diverse part geometries.

In certain embodiments, the support comprises a housing and the bushing is movably mounted in the housing.

The present discussion also relates to a method for manufacturing a part with a hole, comprising the following steps:
- providing an old part comprising a hole;
- localizing the position of the hole of the old part with the localization method described earlier;
- withdrawing the old part from the support;
- providing a new part, similar to the old part;
- installing the new part in the support;
- making a hole in the new part at the position localized in the localization step.

In such a method, the terms of "old" and "new" refer to a first and a second part in their order of installation on the support during the process. These terms say nothing about the use which is made elsewhere of these parts or about their good or poor condition, or even of their wear. Further, stating that the new part is similar to the old part means that the new part is substantially identical with the old part as it was originally. Both parts cannot be identical, notably because the old part contains a hole there where the new one does not include any, specifically in the location where the intention is to make one. Moreover, within a scope of maintenance and/or repair, the old part may be deformed, for example by wear or damage, while the new part will have a slightly different geometry. Within a scope of upgrading components, the new part may also include improvements or modifications as compared with the old part, as long as the modifications in the vicinity of the position to be localized do not hinder the application of the manufacturing method above In certain embodiments, the old part comprises a first portion and a second portion, the hole of the old part being a hole, common to the first and second portions, and the new part comprises the second portion of the old part and a new first portion similar to the first portion of the old part. In other words, the new part comprises the second portion recovered on the old part. Thus, on the new part, the first portion is changed, in which a hole has therefore to be made exactly at the right location for its assembling with the second portion. By a common hole is meant a hole with a same axis passing through the first and second portions.

In these embodiments, the method therefore gives the possibility of localizing a position and making a hole in the new first portion, which is exactly in the axis of the hole of the second portion recovered from the old part. Such a hole then allows assembling both portions, for example by means of a screw, rivet or any other suitable attachment.

In certain embodiments, before the localization step on the old part, the first portion of the old part is withdrawn and in the localization step on the old part, localization of the hole on the second portion is carried out. As the second portion is the one which is desirably retained for the new part, it is advantageous to localize the hole relatively to the second portion, without taking into account possible deformations of the old first portion (i.e. of the first portion of the old part) which is desirably replaced.

In certain embodiments, before withdrawing the old part, a retractable portion of the support is retracted and after installing the new part, this retractable portion is set back into place. The retraction of the retractable portion of the support gives the possibility of facilitating withdrawal of the old part and of introducing the new part into the support. According to another application, the retraction of a retractable portion allows application of the above method to parts of different geometries or characteristics (such as the location of the hole, for example), each part being associated with its own retractable portion.

SHORT DESCRIPTION OF THE DRAWINGS

The invention and advantages thereof will be better understood upon reading the detailed description which follows, of embodiments of the invention given as non-limiting examples. This description refers to the appended drawings, wherein.

DETAILED DESCRIPTION OF THE INVENTION

Figure 1:
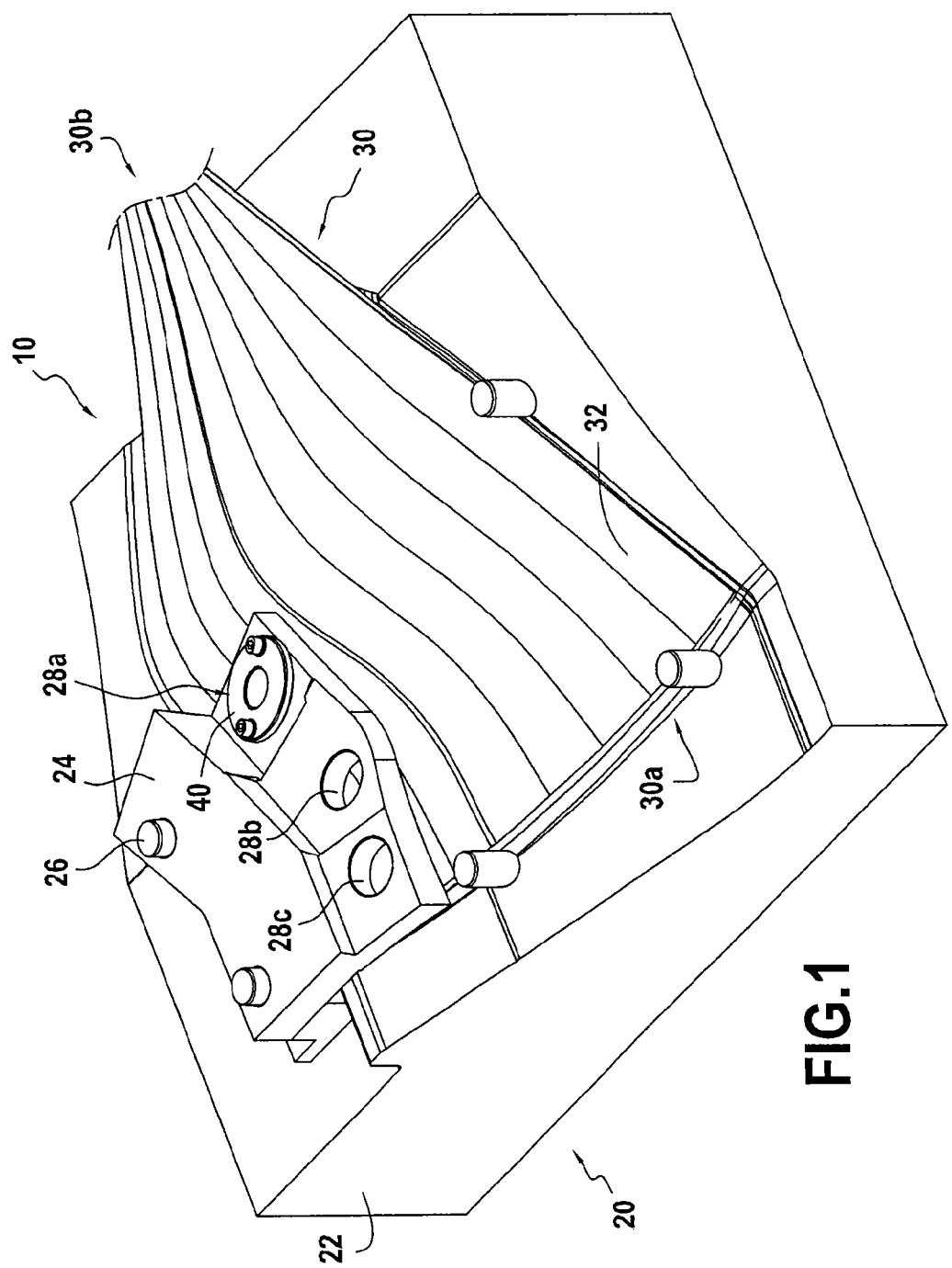
FIG. 1 illustrates a perspective view of a device for localizing a position on a part according to an embodiment of the invention.

FIG. 1 illustrates a perspective view of a device 10 for localizing a position on a part 30 according to an embodiment. The device 10 comprises a support 20 having a fixed portion 22 and a retractable portion 24. In the example illustrated in FIG. 1, the support 20 and notably its fixed portion 22 have a solid shape and which partly fits the shape of the part 30. In other embodiments, the support 20 may only have a few contact points with the part 30.

Moreover, the device 10 may comprise means (not shown) for maintaining the part 30 in position in the support 20. In other words, the part 30 may be attached to the support 20, for example by a clamp.

In FIG. 1, a part 30 is illustrated in the support 20. The part 30 is here a profiled turbine engine element in composite material, the reinforcement of which has been removed. In FIG. 1, only the main body 32 is seen from the part 30. The profiled element forming the part 30 comprises a first end 30a and a second end 30b. For greater stability, the profiled element has been placed on the support 20 at the first end 30a, which is its least variable portion.

The retractable portion 24 of the support is mounted on the fixed portion 22 of the support via studs 26 engaging into matching holes of the retractable portion 24. Further, the retractable portion 24 of the support comprises at least one housing. The retractable portion 24 of the support comprises here three housings 28a, 28b, 28c. Each housing, in this embodiment, is a substantially cylindrical through-hole. However, other shapes may be contemplated.

As indicated earlier, the device 10 comprises a bushing 40 movably mounted relatively to the support 20. In the present embodiment, the bushing 40 is the movably mounted in a housing of the support 20, in this case the housing 28a of the retractable portion 24. The bushing 40 is a bushing with an external cross-section adapted to the cross-section of the housing 28a in which it is located. The bushing 40 here has a substantially circular external cross-section, with a diameter less than that of the cross-section of the housing 28a. Thus, there exists a radial play between the bushing 40 and the housing 28a. The bushing is thus transversely (radially) movable in the housing 28a.

Figure 2:
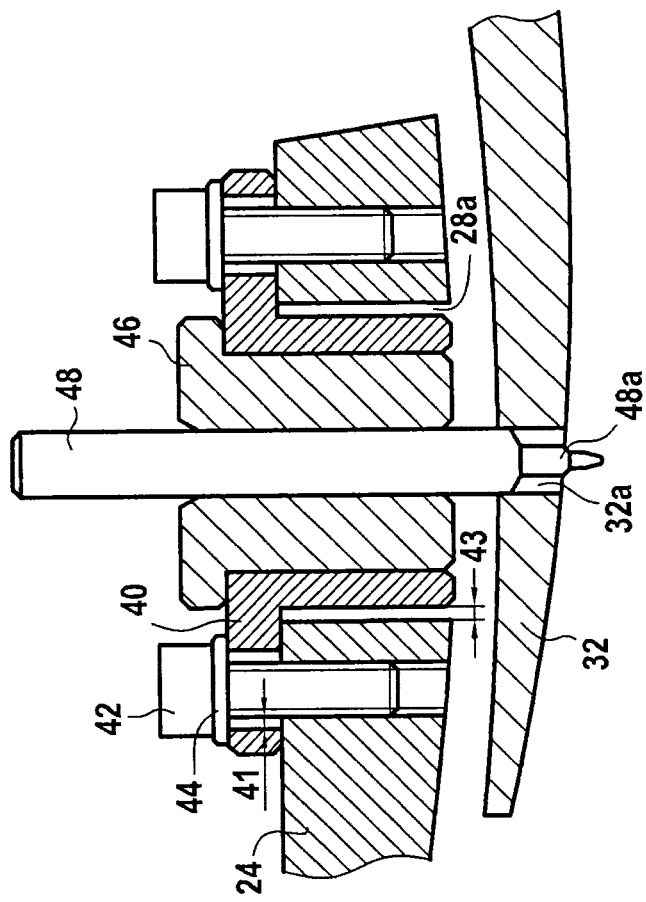
FIG. 2 illustrates a sectional view of a detail of the vicinity of the bushing of this same embodiment.
Figure 3:
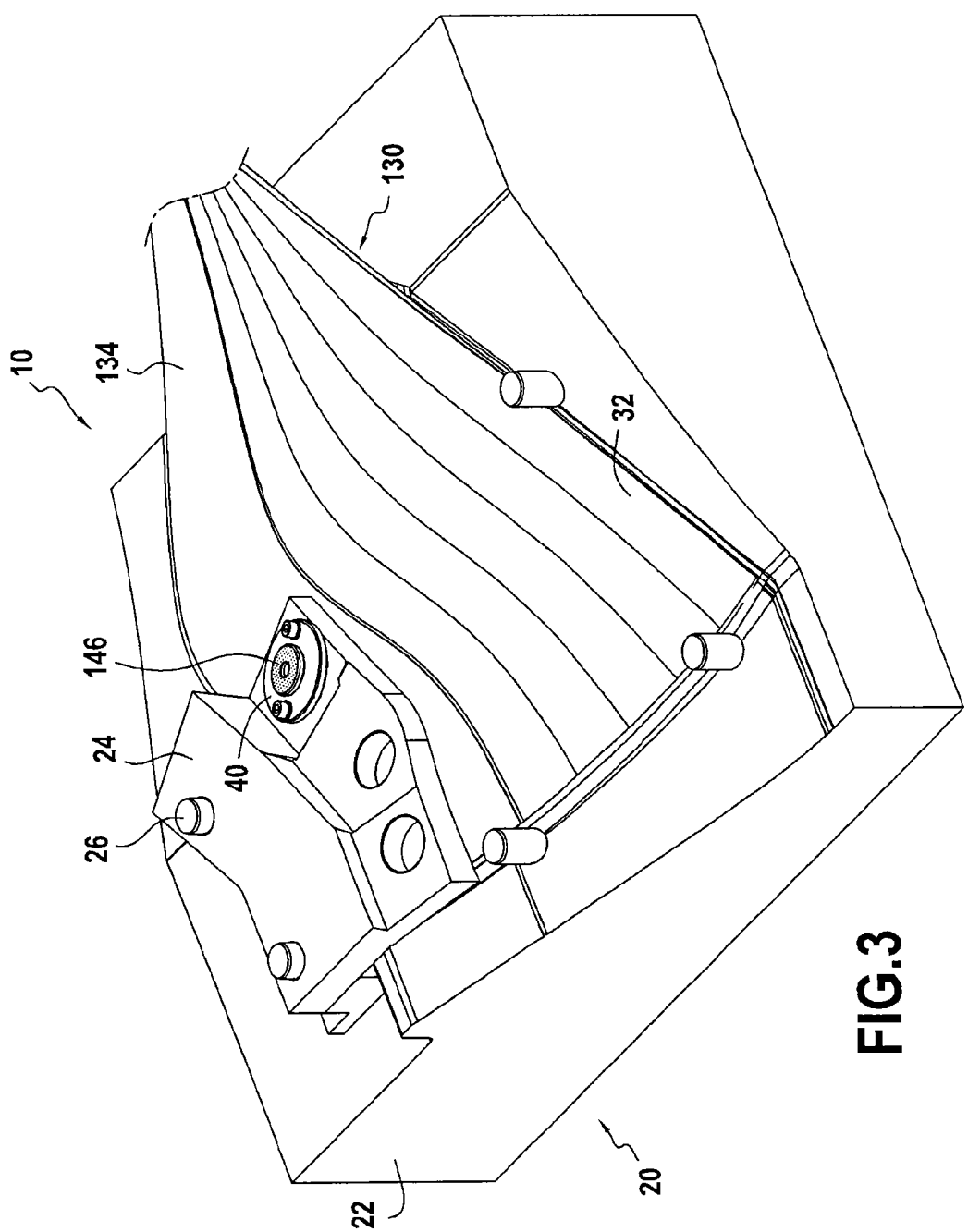
FIG. 3 illustrates a perspective view of the device according to this same embodiment, wherein a new part has been installed.

With reference to FIGS. 1 to 3, a possible use of the device 10 will now be presented within the scope of replacing the reinforcement of a profiled turbine engine element. This description is simply directed to explaining the operation of the device 10 and is not limiting the use which may be made of such a device.

As indicated earlier, the part 30 (old part) is here a profiled turbine engine element in which a reinforcement (first portion) is attached to the main body 32 (second portion). The reinforcement and the main body 32 have a common hole into which may be inserted a rivet or a screw, for example, allowing the reinforcement to be attached on the main body.

In order to replace the reinforcement of the part 30, one begins by removing the reinforcement. Therefore there only remains the main body 32 of the part 30. The support 20 is provided, the retractable portion 24 of which has been withdrawn. The part 30 is placed in the fixed portion 22 of the support and the retractable portion 24 is then replaced. If this has not been already done, the bushing 40 is mounted in a housing 28a, the position of which is close to the hole which is intended to be localized. The bushing 40 is movably mounted in the housing 28a. In particular, the bushing 40 is left free to move at least transversely relatively to its axis. The obtained configuration is the one illustrated in FIG. 1.

A localization member is then inserted into the bushing. In the present embodiment, as illustrated in FIG. 2, the localization member is formed with a localization gun 46 and a rod 48. The rod 48 is inserted into the central hole of the localization gun 46. In order to facilitate localization of the hole 32a, the end 48a of the rod is tapered. In the present embodiment, the end 48a of the rod is gradually tapered. The end 48a of the rod comprises conical and/or cylindrical segments with decreasing diameters upon gradually approaching the tip of the rod. The end 48a of the rod forms a protrusion of the localization member 46, 48. The end 48a of the rod is able to be driven into the sought hole 32a, this is why the localization member includes raised/recessed portions mating those of the hole 32a, which is the position to be localized.

As indicated earlier, the bushing 40 may be attached on the support 20 (here on the retractable portion 24 of the support) by blocking means. The blocking means here are screws 42 each mounted on a washer 44. In other embodiments, the blocking means may assume another shape, for example one or several bolts, a clamping of the vice type or other device.

When the blocking means 42 are loose, the bushing 40 may move in the housing 28a. In particular, there exist a play 41 between the bushing 40 and the screws 42 and a play 43 between the bushing 40 and the housing 28a. The bushing 40 may therefore move within the housing, so that the rod 48 covers a portion of the surface of the part 30 (here reduced to the main body 32). In particular, the bushing may be transversely movable, i.e. relatively to FIG. 2, in a plane substantially perpendicular to the axis of the rod.

The transverse movements of the rod 48 carry along the bushing 40. When the rod 48 detects the sought hole 32a and the end 48a is driven therein, the bushing 40 is located at a position to be localized. The blocking means 42 are then applied for attaching the bushing 40 with respect to the support 20 and for maintaining it in position. Thus, in the example of FIG. 2, the screws 42 are tightened so as to block the bushing 40 in position with respect to the retractable portion 24 of the support.

Once the bushing 40 is maintained in position by the blocking means 42, the localization member comprising the localization gun 46 and the rod 48 may be withdrawn. The part 30 may be then withdrawn from the support 20, optionally by retracting beforehand the retractable portion 24. Subsequently, a new part 130 (illustrated in FIG. 3) is provided which is installed in the support 20 at a position identical with that of the part 30. In this case, the new part 130 comprises the main body 32 of the old part 30, to which a new reinforcement 134 is affixed. The new reinforcement 134 does not yet include any hole at the location localized by the bushing 40. If necessary, once the new part 130 is installed in the support 20, the retractable portion 24 of the support is put back into place. The obtained configuration is illustrated in FIG. 3.

Moreover, as illustrated in FIG. 3, a machining gun 146 was placed on the bushing 40. This machining gun 146 includes a through-hole intended for guiding a machining tool, for example for drilling or milling. The through-hole is at a position of the machining gun 146 such that when the machining gun 146 is inserted to the bushing 40, the through-hole is facing the position localized by the localization member 46, 48. Thus, the machining gun 146 is able to guide a machining tool so that it machines the new part 130, and particularly the reinforcement 134, exactly facing the hole 32a of the main body 32.

The localization device 10 may vary relatively to the illustrated embodiment. For example, the localization member may be formed of with a single part or at least three parts, rather than comprise an independent localization gun 46 and rod 48.

Moreover, the retractable portion 24 may have a geometry adapted to the part on which the localization and/or the machining are desirably achieved. In this case, for a same fixed support portion 22, there may exist several retractable portions 24, each being adapted to a part geometry or to a family of part geometries. Thus, the support 20 may easily be adapted to many part geometries.

In a still more flexible and adaptable way, the support 20 may comprise a jointed portion relatively to the fixed portion 22 of the support, the bushing 40 being mounted on said jointed portion. The joint may for example comprise arms with variable length, ball joint connections, etc. the bushing is thus movable relatively to the support. The jointed portion may be retractable wall connected to a retractable portion such as the retractable portion 24, or further connected permanently to the support, for example connected to the fixed portion 22. The jointed portion may comprise all or part of the blocking means, which gives the possibility of locking the current position of the housing.

Figure 5:
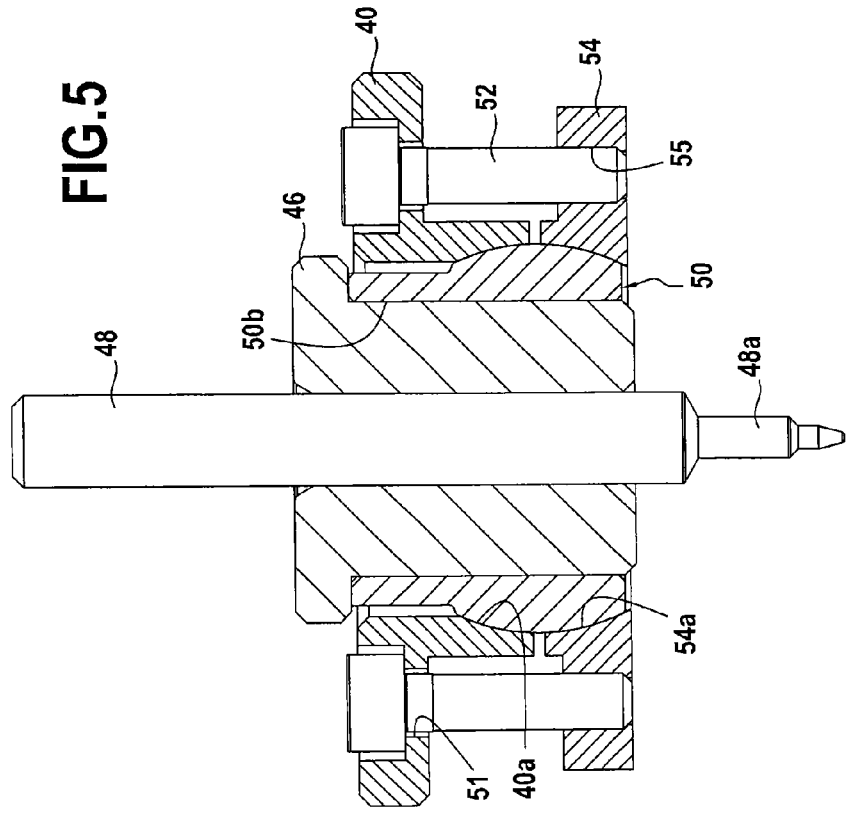
FIG. 5 illustrates a sectional view along with the plane V-V of the device of FIG. 4.
Figure 4:
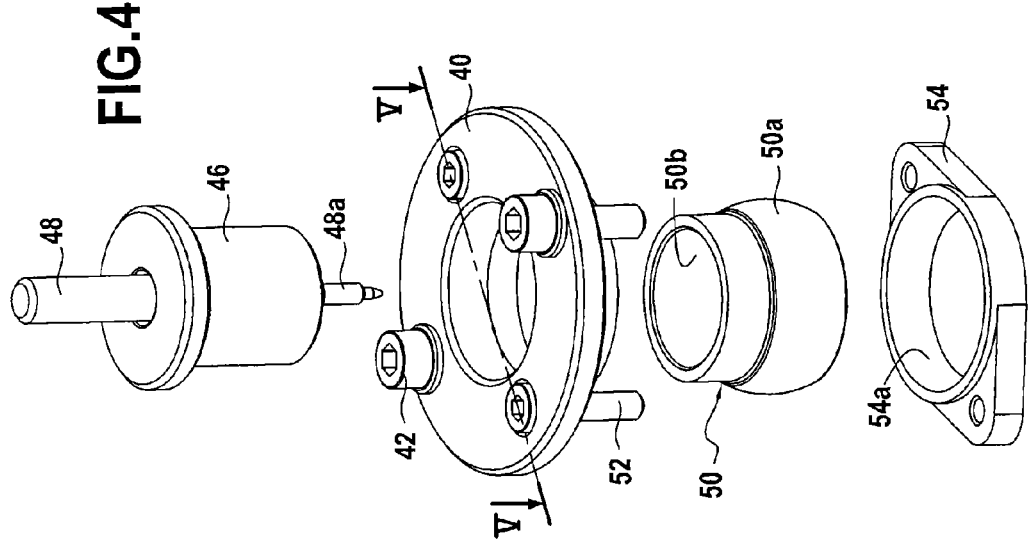
FIG. 4 illustrates an exploded perspective view of a detail of the localization device according to another embodiment of the invention.

Another alternative of the localization device 10 will now be presented with reference to FIGS. 4 and 5. In these figures, the elements corresponding to or identical with those of the first embodiment will receive the same reference sign and will not be described again.

As illustrated in FIG. 4, in this other embodiment, the localization device 10 further comprises a ball joint 50. The ball joint 50 allows rotation of the localization member, i.e. of the localization gun 46 and of the rod 48, when the latter is inserted into the bushing 40. Thus, the ball joint allows adjustment of the position of the localization member for aligning the axis of the rod 48 with the axis of the position to be localized, for example the axis of a hole or of a protrusion.

In this case, the ball joint 50 is mounted into the bushing 40. Thus, in this embodiment, inserting the localization member into the bushing 40 means inserting the localization member into the ball joint 50, which is itself inserted into the bushing 40. To do this, the ball joint 50 comprises an internal portion 50b configured for cooperating with the localization member. Here, the internal portion 50b assumes the shape of a hollow cylinder.

Further, in order to allow its rotation, the ball joint 50 comprises a partly spherical external portion 50a. The external portion 50a is mounted between the bushing 40 and a cup 54 forming a locking element (see FIG. 5). The bushing 40 and the cup 54 respectively have internal shapes 40a, 54a adapted for receiving the ball joint 50 and allowing its rotation, in this case mating concave shapes, more particularly as a sphere portion.

The cup 54 is connected to the bushing 40, for example by screws 52. The screws 52 cross the smooth holes 51 of the bushing 40 and tapped holes 55 of the cup 54. Thus, rotation of the screws 52 gives the possibility, according to the direction, of moving away the cup 54 from the bushing 40 or bringing it closer to it.

When the cup 54 and the bushing 40 are relatively far from each other, a play exists between the partly spherical external portion 50a of the ball joint 50 and the respective concave internal shapes 40a, 54a of the bushing 40 and of the cup 54. In this configuration, the ball joint 50 may be set into rotation.

When the cup 54 and the bushing 40 are relatively close to each other, as illustrated in FIG. 5, the partly spherical external portion 50a of the ball joint 50 is maintained clamped and blocked by the respective concave internal shapes 40a, 54a of the bushing 40 and of the cup 54, and so that the ball joint 50 is maintained in position. Thus, the screws 52 and the cup 54 form blocking means for maintaining a position of the ball joint 50 and, by extension, of the localization member which is inserted therein.

Independently of the rotation of the ball joint 50 into the bushing 40, the displacement and the blocking of the bushing 40 in translation is carried out to in a way similar to the first embodiment.

Although the present invention has been described by referring to specific exemplary embodiments, modifications may be provided to these examples without the departing from the general scope of the invention as defined by the claims. In particular, individual characteristics of the different illustrated/mentioned embodiments may be combined in additional embodiments. Therefore, the description and the drawings should be considered in an illustrative rather than in a restrictive sense.

What is claimed is:

1. A device for localizing a position on a part, comprising:
a support configured for receiving the part;
a bushing movably mounted with respect to the support, the bushing including a flange with a hole;
a removable localization member configured so as to be inserted into the bushing; and
blocking means that is located in the hole of the flange to fix the bushing with respect to the support and to maintain it in position,
wherein the support comprises at least one housing and the bushing is movably mounted in said housing so that a radial play exists between the bushing and the housing, whether the bushing is fixed or not by the blocking means, and
wherein the housing is made in a retractable portion of the support and the retractable portion is mounted on a fixed portion of the support via studs.

2. The device according to claim 1, wherein the localization member has a raised/recessed portion mating a raised/recessed of the position to be localized.

3. The device according to claim 1, wherein the localization member comprises a probe.

4. The device according to any of claim 1, further comprising a ball joint allowing rotation of the localization member when the latter is inserted into the bushing, and wherein the blocking means comprise a locking element configured for blocking rotation of the ball joint.

5. The device according to claim 1, wherein the studs are engaged in matching holes of the retractable portion.

6. The device according to claim 1, wherein the blocking means include screws each mounted on a washer.

7. The device according to claim 1, wherein the at least one housing of the support includes three housings and each of the three housings includes a through-hole.

8. The device according to claim 7, wherein the through-hole in each of the three housings is substantially cylindrical.

9. The device according to claim 1, wherein the retractable portion of the support includes a hole and the blocking means are configured to be inserted into the hole in the retractable portion of the support to block the bushing in position with respect to the retractable portion of the support.

10. The device according to claim 9, wherein the blocking means include a screw mounted on a washer.

11. The device according to claim 1, wherein the studs protrude upwardly from a top face of the support and the retractable portion is configured to be placed on the studs such that the studs extend through holes in the retractable portion of the support.

12. The device according to claim 1, wherein the studs are fixed on a predetermined position on the support prior to the retractable portion being mounted on the support such that the retractable portion is repeatedly mounted at a same predetermined position on the support.

* * * * *